(12) United States Patent
Faruque et al.

(10) Patent No.: US 10,618,486 B2
(45) Date of Patent: Apr. 14, 2020

(54) BUMPER ASSEMBLY WITH VARIABLE STIFFNESS

(71) Applicant: Ford Global Technologies, LLC, Dearborn, MI (US)

(72) Inventors: Mohammad Omar Faruque, Ann Arbor, MI (US); Saeed David Barbat, Novi, MI (US); Yali Li, Saline, MI (US); James Chih Cheng, Troy, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/988,841

(22) Filed: May 24, 2018

(65) Prior Publication Data
US 2019/0359158 A1  Nov. 28, 2019

(51) Int. Cl.
*B60R 19/48* (2006.01)
*B60R 19/02* (2006.01)
*B60R 19/18* (2006.01)
*B60R 19/03* (2006.01)
*B60R 19/00* (2006.01)

(52) U.S. Cl.
CPC ............ *B60R 19/48* (2013.01); *B60R 19/023* (2013.01); *B60R 19/03* (2013.01); *B60R 19/18* (2013.01); *B60R 2019/007* (2013.01); *B60R 2019/486* (2013.01)

(58) Field of Classification Search
CPC . B60R 21/08; B60R 19/18; B60P 3/07; B60P 3/32; B60T 7/06; B62D 21/152; B62D 21/157; B60N 2/42736; B60N 2/4235; B60N 2/4221
See application file for complete search history.

(56) References Cited

U.S. PATENT DOCUMENTS

| | | | | |
|---|---|---|---|---|
| 4,765,665 A | * | 8/1988 | Akahoshi | B60R 19/18 293/102 |
| 4,830,416 A | * | 5/1989 | Matsuoka | B60R 19/18 293/120 |
| 4,830,418 A | * | 5/1989 | Gest | B60R 19/26 248/636 |
| 4,974,891 A | * | 12/1990 | Furuta | B60R 19/02 293/104 |
| 5,080,411 A | * | 1/1992 | Stewart | B60R 19/18 293/102 |

(Continued)

FOREIGN PATENT DOCUMENTS

| | | |
|---|---|---|
| CN | 101590835 A | 12/2009 |
| DE | 19860249 C1 | 7/2000 |

(Continued)

*Primary Examiner* — Kiran B Patel
(74) *Attorney, Agent, or Firm* — Frank A. MacKenzie; Bejin Bieneman PLC (57) ABSTRACT

A component, e.g., a bumper assembly, of a vehicle includes a fascia spaced from a bumper beam, a structure defining gaps between the structure and the bumper beam and between the structure and the fascia, and a computer programmed to supply electrical current to vary a stiffness of the structure in response to a vehicle speed beyond a threshold.

20 Claims, 6 Drawing Sheets

(56) References Cited

U.S. PATENT DOCUMENTS

| | | | | |
|---|---|---|---|---|
| 5,201,912 A * | 4/1993 | Terada | B60R 19/18 | 293/120 |
| 6,003,912 A * | 12/1999 | Schonhoff | E02D 3/10 | 293/122 |
| 6,099,055 A * | 8/2000 | Hirota | B60R 19/18 | 293/120 |
| 6,164,709 A * | 12/2000 | Kuczynski | B60R 19/18 | 293/109 |
| 6,244,638 B1 * | 6/2001 | Kuczynski | B60R 19/18 | 188/377 |
| 6,354,641 B1 * | 3/2002 | Schroeder | B60R 19/18 | 293/122 |
| 6,412,836 B1 * | 7/2002 | Mansoor | B60R 19/18 | 293/132 |
| 6,428,064 B1 * | 8/2002 | Frederick | B60R 19/18 | 293/120 |
| 7,497,491 B2 | 3/2009 | Zanella et al. | | |
| 8,215,686 B2 * | 7/2012 | Czopek | B29C 51/10 | 293/133 |
| 8,967,687 B2 * | 3/2015 | Kosaka | B60R 19/18 | 293/102 |
| 2001/0017473 A1 * | 8/2001 | Yamamoto | B60R 19/18 | 293/102 |
| 2004/0256868 A1 * | 12/2004 | Yoon | B60R 19/18 | 293/120 |
| 2007/0080009 A1 * | 4/2007 | Kowalski | B60R 19/52 | 180/68.6 |
| 2008/0093867 A1 * | 4/2008 | Glasgow | B60R 19/18 | 293/102 |
| 2017/0232917 A1 * | 8/2017 | Nakayama | B60R 19/04 | 293/102 |

FOREIGN PATENT DOCUMENTS

| | | |
|---|---|---|
| GB | 2527926 A | 1/2016 |
| JP | 2005088732 A | 4/2005 |
| WO | 2012113362 A1 | 8/2012 |

* cited by examiner

BUMPER ASSEMBLY WITH VARIABLE STIFFNESS

BACKGROUND

Bumpers of vehicles are designed to absorb energy and/or transfer energy during vehicle impacts. Such vehicle impacts may include frontal and rear impacts. One consideration is minimizing injury during an impact to a pedestrian, e.g., to a pedestrian's legs. These impacts may be simulated by pedestrian protection (PedPro) impact tests. Another consideration for the design of the bumper is low-speed damageability, which is simulated by crash tests that measure the amount of damage to the exterior of the vehicle resulting from low-speed impacts. In these tests, little or no exterior damage to the vehicle is desired to reduce the likelihood of costly repairs resulting from low-speed impacts. Other considerations factor as well.

DETAILED DESCRIPTION

A vehicle component includes a bumper beam and a fascia spaced from the bumper beam; a structure defining gaps between the structure and the bumper beam and between the structure and the fascia; and a computer programmed to supply electrical current to vary a stiffness of the structure in response to a vehicle speed beyond a threshold.

The structure may include a shape-memory polymer.

The structure may be a composite material including a matrix material and a reinforcement material; the matrix material may be a polymer; and the reinforcement material may be electrically conductive. The reinforcement material may be one of carbon fiber and carbon nanotubes.

The vehicle component may further include a voltage source electrically coupled to the structure. The computer may be coupled to the voltage source and programmed to instruct the voltage source to supply electrical current through the structure in response to a vehicle speed being one of above and below the threshold. The computer may be programmed to instruct the voltage source to supply electrical current through the structure in response to a vehicle speed being one of above and below the threshold for at least a specified amount of time.

The vehicle component may further include a fan positioned to move air through at least one of the gaps. The computer may be coupled to the fan and programmed to actuate the fan in response to a vehicle speed being one of above and below the threshold. The computer may be programmed to actuate the fan in response to a vehicle speed being one of above and below the threshold for at least a specified amount of time.

The vehicle component may further include a temperature sensor thermally connected to the structure and coupled to the computer, and the computer may be further programmed to actuate the fan to maintain the structure at a target temperature so long as the vehicle speed is one of above and below the threshold.

The computer may be further programmed to supply electrical input to the structure in response to a vehicle speed beyond the threshold for at least a specified amount of time.

The stiffness of the structure may decrease in response to increasing temperature; the structure may have an electrical resistance such that the structure generates heat in response to electrical input; and the computer may be programmed to supply electrical current to the structure in response to a vehicle speed above the threshold.

The vehicle component may further include a temperature sensor thermally connected to the structure and coupled to the computer, and the computer may be further programmed to supply electrical current to maintain the structure at a target temperature so long as the vehicle speed is above the threshold.

The bumper beam and the fascia may define a volume directly between the bumper beam and the fascia in a vehicle-forward direction, and the structure may occupy less than half of the volume.

A vehicle component includes a fascia spaced from a bumper beam; a structure defining gaps between the structure and the bumper beam and between the structure and the fascia; and means for varying a stiffness of the structure based on a vehicle speed.

The means for varying the stiffness of the structure may include means for heating the structure. The means for heating the structure may be means for resistive heating of the structure.

The means for varying the stiffness of the structure may further include means for cooling the structure.

The means for varying the stiffness of the structure may include means for cooling the structure.

With reference to the Figures, a component of a vehicle 32 includes bumper beam 36 and a fascia 34 spaced from the bumper beam 36. The vehicle 32 includes a structure 38 defining gaps 40 between the structure 38 and the bumper beam 36 and between the structure 38 and the fascia 34. The vehicle 32 includes a computer 42 programmed to supply electrical current to vary a stiffness of the structure 38 in response to a vehicle speed beyond a threshold. For the purposes of this disclosure, "stiffness" is defined as the extent to which a body resists deformation in response to an applied force.

The component may be, for example, a bumper assembly 30. Alternatively, the component may be any suitable component of the vehicle 32.

The bumper assembly 30 satisfies multiple design considerations by having different stiffnesses at different speeds. At lower speeds, the stiffness of the bumper can be increased, and the damageability of the bumper assembly 30 in a low-speed impact may be reduced. At higher speeds, the stiffness of the bumper assembly 30 can be decreased, and the bumper assembly 30 may be more compliant and absorb more energy, which may reduce injuries to a pedestrian during an impact. Moreover, the bumper assembly 30 can have no moving parts, which may simplify the design and reduce costs.

Figure 1:
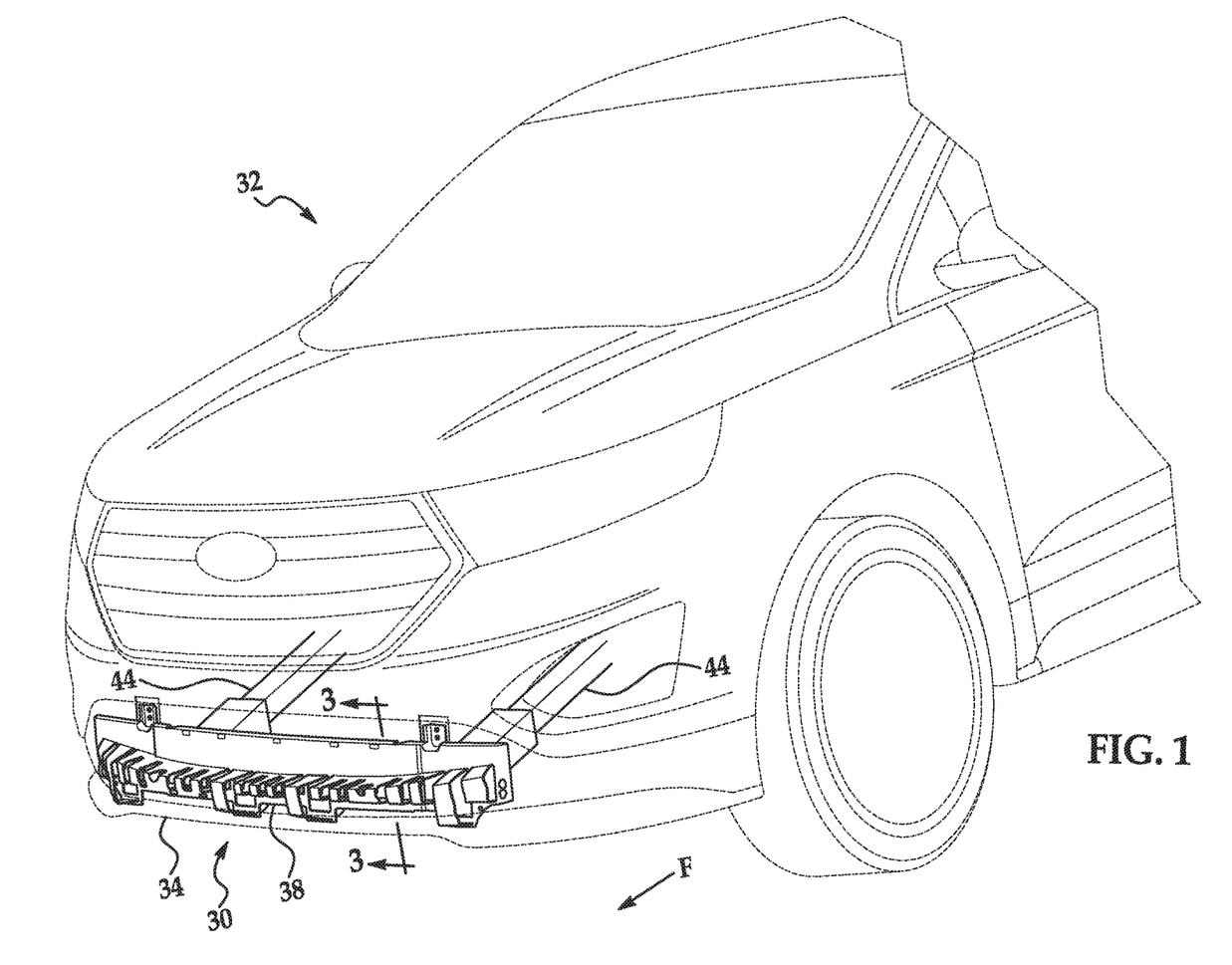
FIG. 1 is a perspective view of an example vehicle.

With reference to FIG. 1, the vehicle 32 includes a frame 44, and the bumper assembly 30 is attached to the frame 44. The bumper assembly 30 may be disposed toward a front of the vehicle 32, as shown in FIG. 1, or toward a rear of the vehicle 32. The bumper assembly 30 may protrude from the frame 44 such that the bumper assembly 30 is the first component of the vehicle 32 impacted in a front or rear collision.

The frame 44 may be of any suitable construction, e.g., unibody construction, body-on-frame construction, or of any other suitable construction. The frame 44 may be formed of any suitable material, for example, steel, aluminum, etc.

Figure 2:
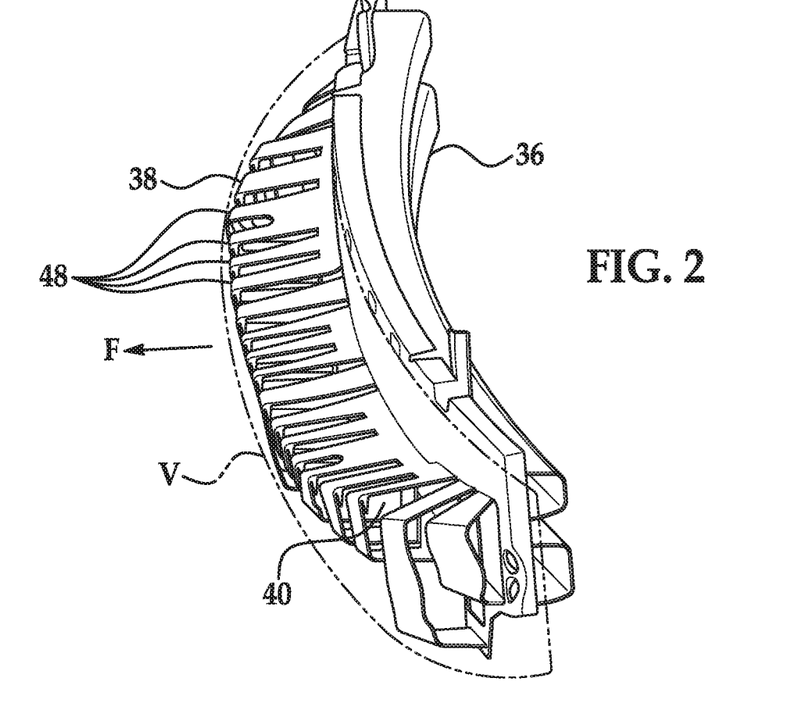
FIG. 2 is a side perspective view of an example bumper assembly of the vehicle.
Figure 3:
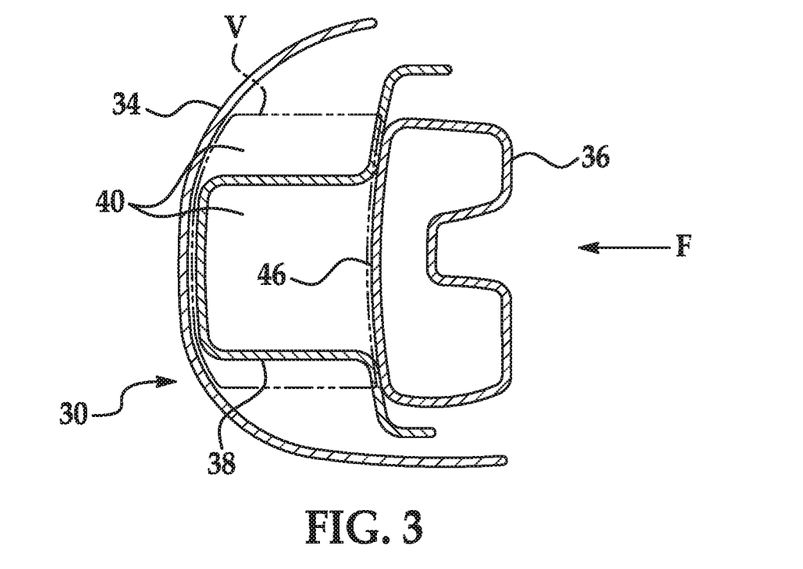
FIG. 3 is a cross-sectional view of the bumper assembly.

With reference to FIGS. 1-3, the bumper assembly 30 may include the bumper beam 36 fixed to the frame 44, the structure 38 fixed to the bumper beam 36, and the fascia 34 fixed to the bumper beam 36 or the frame 44.

The bumper beam 36 extends longitudinally across a front or rear of the vehicle 32. The bumper beam 36 may have a vehicle-outward face 46, which for a front bumper assembly 30 faces the direction of the vehicle 32 when traveling forward and for a rear bumper assembly 30 faces the direction of the vehicle 32 when traveling in reverse. The bumper beam 36 may reinforce the structural integrity of the vehicle 32. The bumper beam 36 may be formed of any suitable material, for example, steel, aluminum, etc.

Returning to FIG. 1, the fascia 34 is fixed relative to the bumper beam 36 and spaced from the bumper beam 36. The fascia 34 may be elongated parallel to the bumper beam 36. The fascia 34 is coupled to the bumper beam 36, either directly or indirectly. The fascia 34 may extend around the structure 38 and the rest of the bumper assembly 30, thereby concealing the bumper assembly 30. The fascia 34 may present a class-A surface, i.e., a surface specifically manufactured to have a high-quality, finished aesthetic appearance free of blemishes. The fascia 34 may be supported by the frame 44 and/or body components of the vehicle 32.

With reference to FIGS. 2 and 3, the structure 38 may be attached to the vehicle-outward face 46 of the bumper beam 36. The structure 38 may be partially flush with the bumper beam 36, as shown in FIG. 3, or the structure 38 may be completely spaced from the bumper beam 36. The structure 38 may be coupled to the bumper beam 36. For example, the structure 38 may be fastened to the bumper beam 36.

Figure 4:
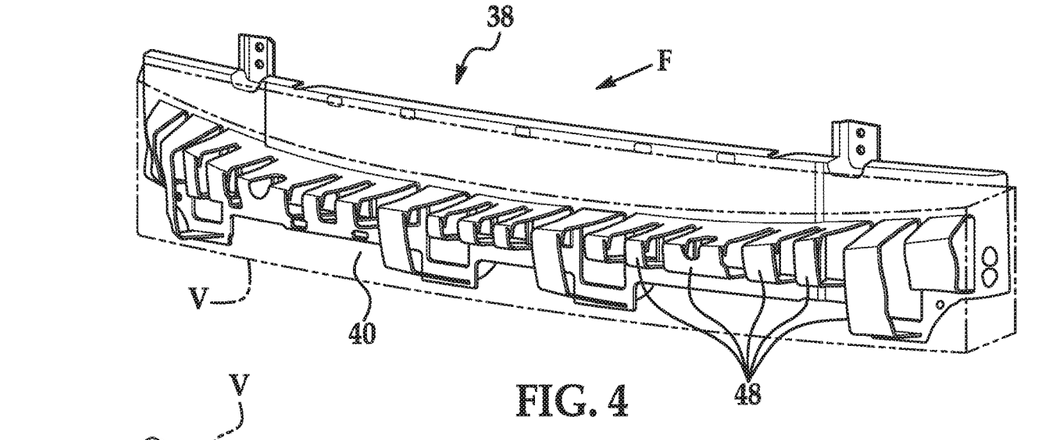
FIG. 4 is a perspective view of an example structure of the bumper assembly.
Figure 5:
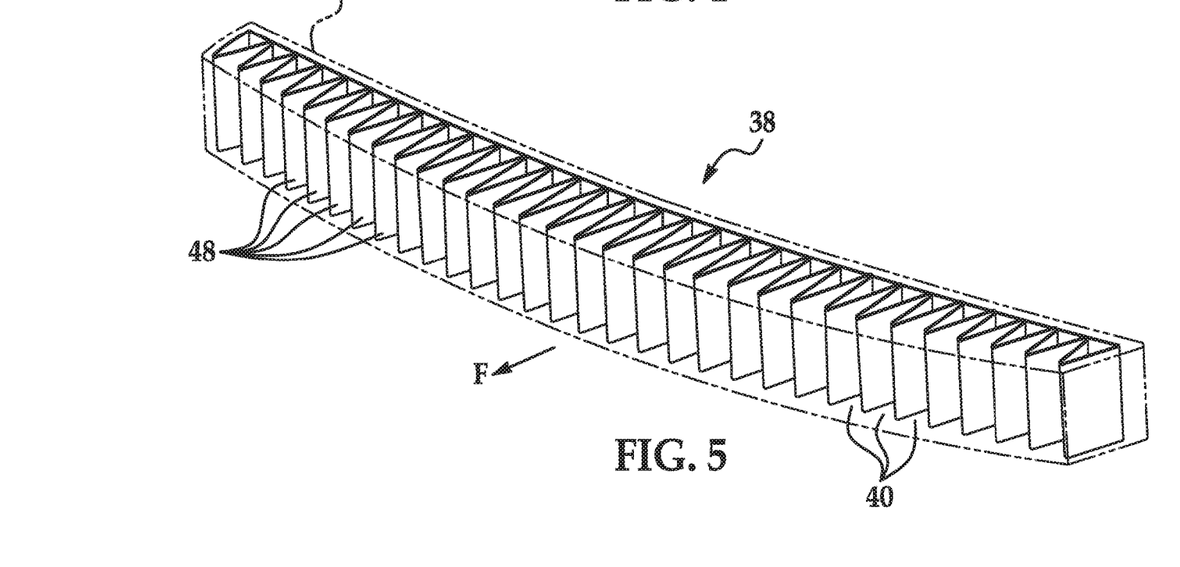
FIG. 5 is a perspective view of another example structure of the bumper assembly.
Figures 6, 7:
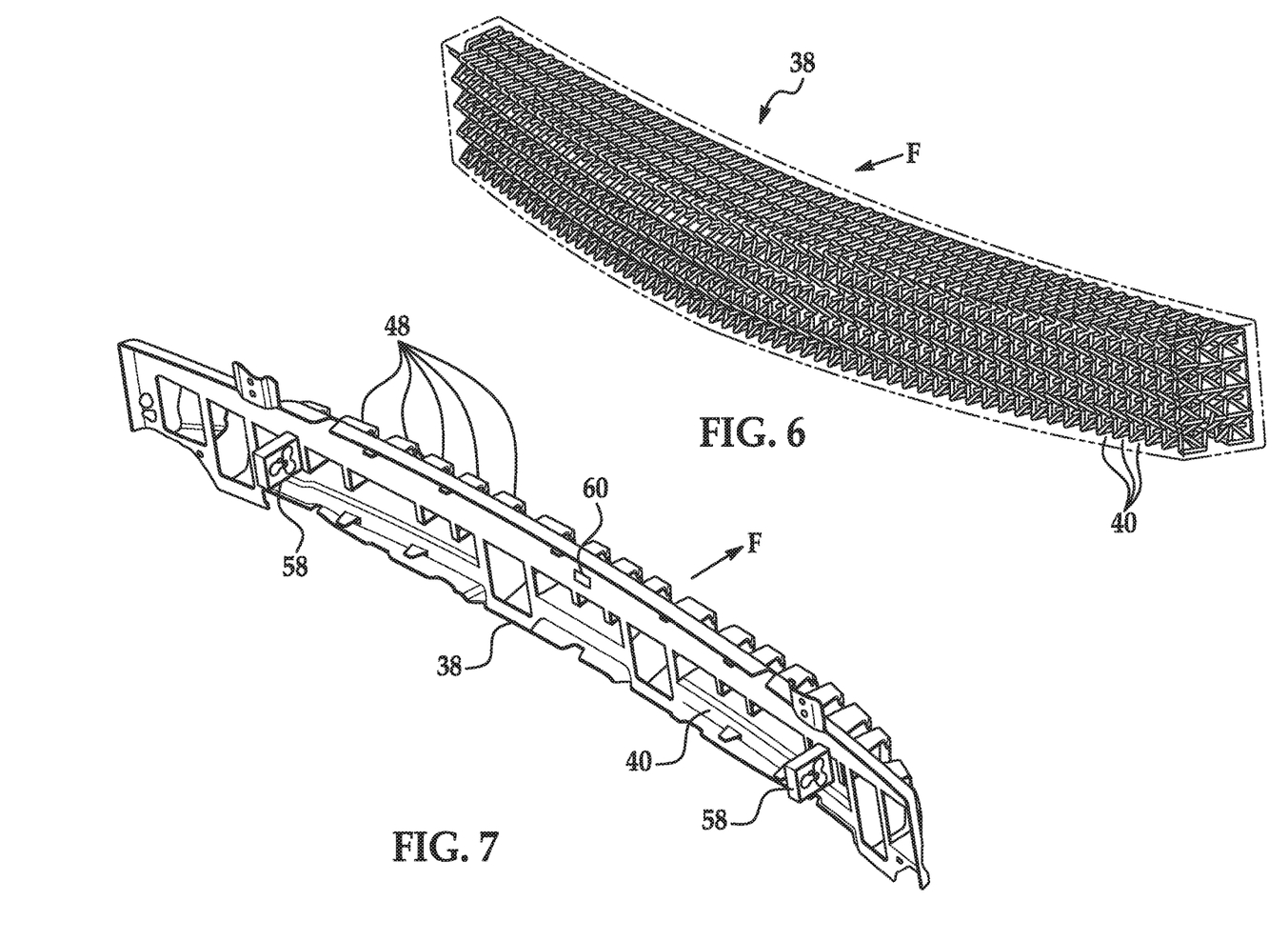
FIG. 6 is a perspective view of another example structure of the bumper assembly.
FIG. 7 is a rear perspective view of the structure.

With reference to FIGS. 3-7, the structure 38 defines the gaps 40 between the structure 38 and the bumper beam 36 and between the structure 38 and the fascia 34. The gaps 40 are space directly between the structure 38 and either the bumper beam 36 or the fascia 34 in a vehicle-forward direction F. The bumper beam 36 and the fascia 34 define a volume V directly between the bumper beam 36 and the fascia 34 in the vehicle-forward direction F, and the structure 38 occupies less than half of the volume V; i.e., a volume of the structure 38 is less than half of the volume V directly between the bumper beam 36 and the fascia 34 in the vehicle-forward direction F. More than half of the volume V is not occupied by the structure 38, e.g., is empty space, is filled with foam, etc. For example, the structure 38 may include a plurality of arches 48 extending from the bumper beam 36 toward the fascia 34; the arches 48 may be oriented horizontally, as shown in FIG. 4, or vertically, as shown in FIG. 5. The arches 48 may be uniform, as shown in FIG. 5, or nonuniform, as shown in FIG. 4. For another example, the structure 38 may have a lattice shape, as shown in FIG. 6.

Figure 8:
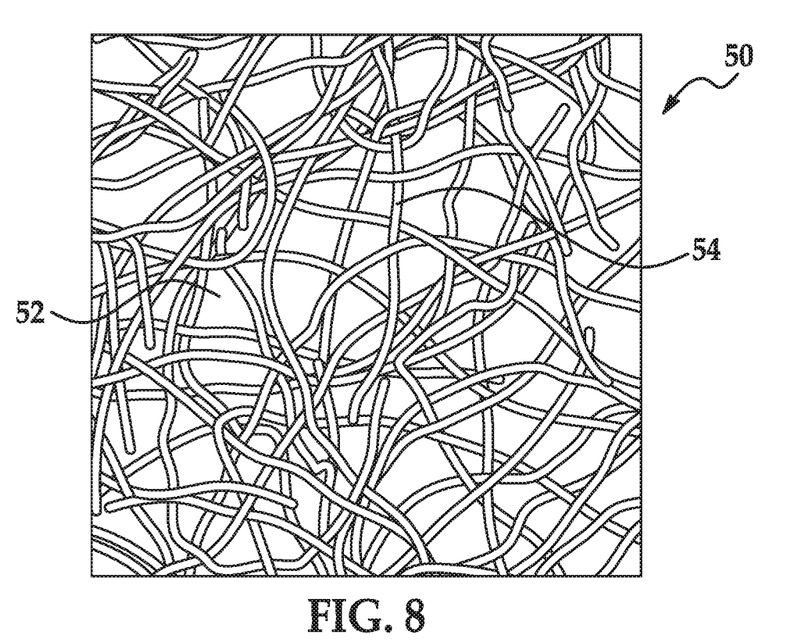
FIG. 8 is a diagram of a material of the structure.

With reference to FIG. 8, the structure 38 may be a composite material 50 including a matrix material 52 and a reinforcement material 54. The matrix material 52 may be a polymer, e.g., shape-memory polymer. The shape-memory polymer may be, e.g., a thermoplastic or a thermoset. The stiffness of the matrix material 52, and thus of the structure 38, decreases in response to increasing temperature. The temperature-dependent stiffness is a property of the matrix material 52. For example, the molecular structure 38 of the matrix material 52 may include crosslinks that remain under any typical working conditions, e.g., below a breakdown temperature $T_{perm}$ that is higher than expected operating conditions; and the molecular structure 38 of the matrix material 52 may also include switching segments that soften above an onset temperature $T_o$. The onset temperature $T_o$ may be, e.g., the glass transition temperature $T_g$, the melting temperature $T_m$, or another temperature. Besides the variable stiffness, another benefit of the shape-memory polymer is that if the structure 38 is deformed, e.g., during an impact, applying heat to the structure 38 may recover the original shape, i.e., undo the deformation, which can reduce repair costs.

The reinforcement material 54 may be suspended or embedded in the matrix material 52. The reinforcement material 54 is electrically conductive. The electrical resistance of the reinforcement material 54 and/or the structure 38 may be high, e.g., sufficiently high that the structure 38 generates appreciable heat in response to electrical voltage. In other words, the reinforcement material 54, and thus the structure 38, is adapted to resistive heating, i.e., Joule heating. For example, the reinforcement material 54 may be carbon fiber and/or carbon nanotubes. For example, the reinforcement material may be a carbon nanotube (CNT) sponge. The reinforcement material 54 may have a sufficiently high density and a sufficiently high electrical resistance to be able to raise the temperature of the structure 38 above the onset temperature $T_o$.

Figure 9:
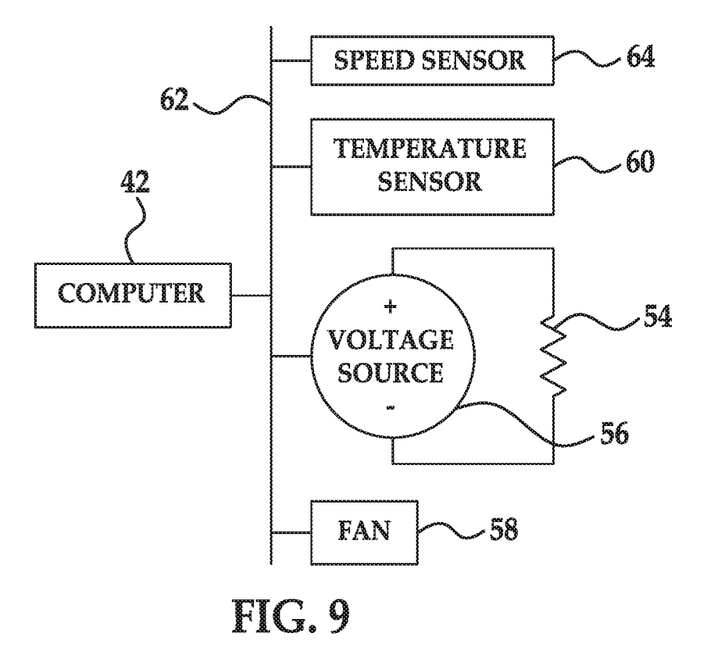
FIG. 9 is a block diagram of a control system of the bumper assembly.

With reference to FIG. 9, a voltage source 56 is electrically coupled to the structure 38. The voltage source 56 supplies electricity that flows through the structure 38, e.g., through the reinforcement material 54. The voltage source 56 is a two-terminal device capable of maintaining a voltage through a circuit formed by connecting one or more circuit elements to the two terminals. The voltage source 56 may be, e.g., a battery such as a lithium-ion battery, a nickel-metal hydride battery, or a lead-acid battery; a capacitor such as an ultracapacitor; etc.

When the voltage source 56 is active, i.e., when current is flowing through the voltage source 56, the electrical resistance of the reinforcement material 54 causes the reinforcement material 54 to generate heat. The heat generated by the reinforcement material 54 raises the temperature of the structure 38, which lowers the stiffness of the matrix material 52 and the reinforcement material 54.

With reference to FIGS. 7 and 9, at least one fan 58 may be positioned to move air through at least one of the gaps 40. For example, as shown in FIG. 7, the fans 58 may be positioned to move air through the gaps 40 between the structure 38 and the bumper beam 36. In other words, the fans 58 are aimed such that exhaust from the fans 58 moves through the gaps 40. Specifically, the fans 58 may be aimed directly at the gaps 40, and/or may be aimed such that exhaust from the fans 58 is deflected by other structures and into the gaps 40. The movement of the air past the structure 38 can increase the rate of heat transfer from the structure 38 to the air, thus cooling the structure 38. Cooling the structure 38 may increase the stiffness of the matrix material 52. Alternatively or additionally, an air-conditioning (AC) unit of the vehicle 32 may be positioned to direct cool air to the structure 38, which may result in faster cooling.

With reference to FIG. 9, a temperature sensor 60 may be thermally connected to the structure 38. For the purposes of this description, "thermally connected" means attached such that heat may flow such that both ends of the thermal connection (if separate) are substantially the same temperature within a short time period. The thermal connection may be convective and/or conductive. The temperature sensor 60 detects a temperature of a surrounding environment or an object in contact with the temperature sensor 60. The temperature sensor 60 may be any device that generates an output correlated with temperature, e.g., a thermometer, a bimetallic strip, a thermistor, a thermocouple, a resistance thermometer, a silicon bandgap temperature sensor, etc.

The computer 42 is a microprocessor-based controller. The computer 42 includes a processor, memory, etc. The memory of the computer 42 includes memory for storing instructions executable by the processor as well as for electronically storing data and/or databases.

The computer 42 may transmit and receive data through a communications network 62 such as a controller area network (CAN) bus, Ethernet, WiFi, Local Interconnect Network (LIN), onboard diagnostics connector (OBD-II), and/or by any other wired or wireless communications network. The computer 42 may be communicatively coupled to the voltage source 56, the fan 58, the temperature sensor 60, a speed sensor 64, and other components via the communications network 62.

The speed sensor 64 may be any sensor suitable for measuring the speed of the vehicle, for example, as is known, a mechanical or eddy-current speedometer, or a vehicle speed sensor. For example, the speed sensor 64 may use a magnetic field detector to count interruptions of a magnetic field by a toothed metal disk disposed on a driveshaft of the vehicle.

The vehicle 32 includes means for varying the stiffness of the structure 38 based on vehicle speed and structural equivalents. The means for varying stiffness may include means for heating the structure 38 and/or cooling the structure 38. The means for heating the structure 38 may include means for resistive heating of the structure 38. For example, the means for heating the structure 38 may include the voltage source 56 and the reinforcement material 54 or any other known manner for resistive heating, e.g., high-resistance wires embedded in the structure 38. For example, the means for cooling the structure 38 may include the fans 58 or any other known manner for cooling, e.g., lines circulating refrigerant, water, etc.; an AC unit; etc.

Figure 10:
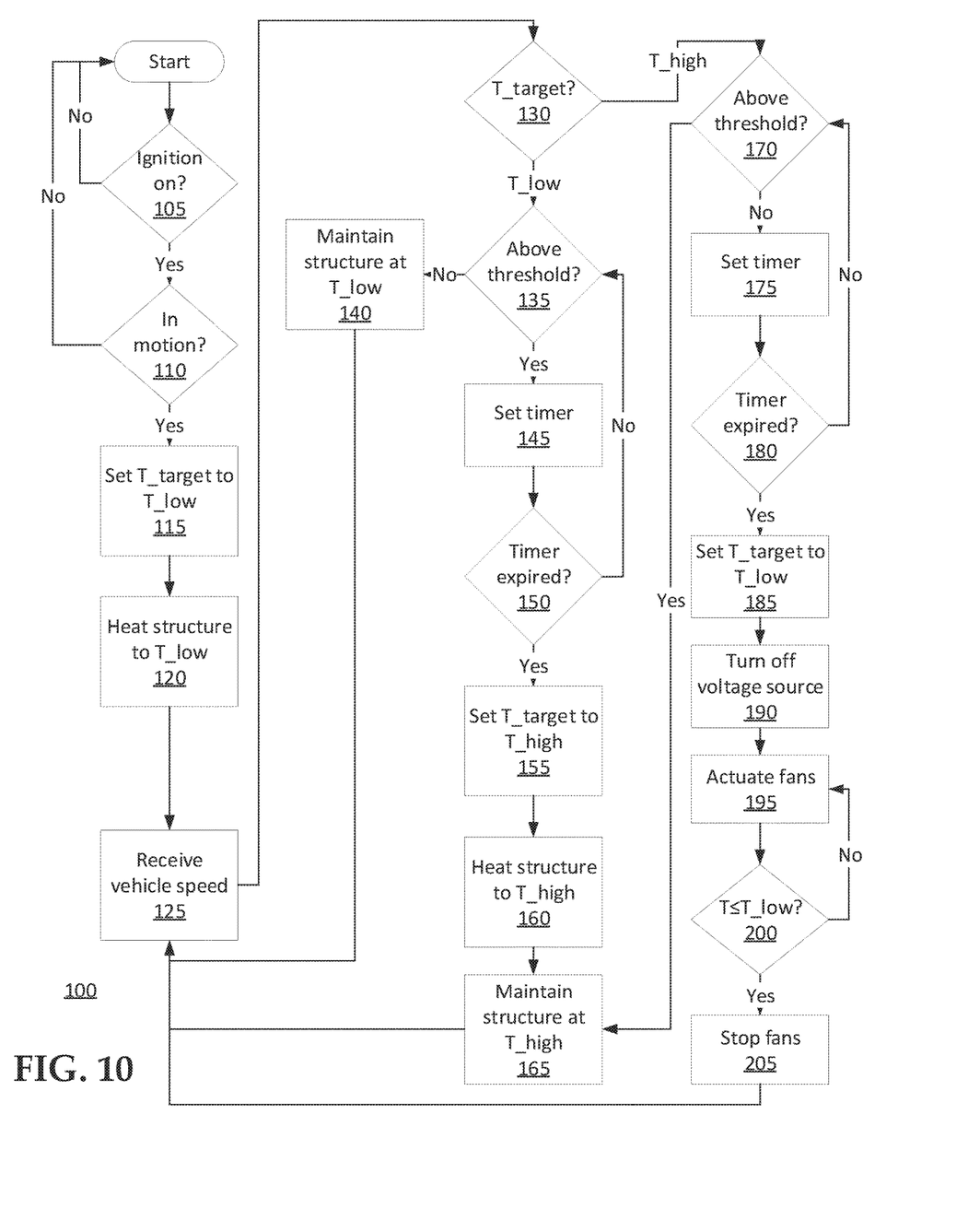
FIG. 10 is a process flow diagram of an example process for varying a stiffness of the structure.

FIG. 10 is a process flow diagram illustrating an exemplary process 100 for varying the stiffness of the structure 38. The memory of the computer 42 stores executable instructions for performing the steps of the process 100. In general, in the process 100, the computer 42 is programmed to supply electrical current to vary a stiffness of the structure 38 based on a speed of the vehicle 32, in particular when the speed is beyond a threshold. The threshold may be in units of speed, e.g., miles per hour, and may be chosen to be between a range of speeds at which pedestrian protection is a predominant consideration and a range of speeds at which high-speed-impact performance is a predominant consideration; for example, the threshold may be 25 miles per hour. The computer 42 can supply electrical current to vary the stiffness when the speed is beyond the threshold by, e.g., (1) instructing the voltage source 56 to supply electrical current through the structure 38 in response to the speed being above the threshold and/or (2) actuating the fan 58 in response to the speed being below the threshold.

The process 100 begins in a decision block 105, in which the computer 42 determines whether an ignition of the vehicle 32 is on. If the ignition is off, the process 100 returns to the start; in other words, the process 100 does not begin until the ignition is on.

If the ignition is on, next, in a decision block 110, the computer 42 determines whether the vehicle 32 is in motion. The computer 42 may determine whether a speed v of the vehicle 32 is greater than zero based on data from the speed sensor 64, a GPS sensor, etc. If the vehicle 32 is not in motion, the process 100 returns to the start; in other words, the process 100 does not begin until the vehicle 32 begins moving.

If the vehicle 32 is in motion, next, in a block 115, the computer 42 sets a stored value $T_{target}$ to a value representing a lower temperature $T_{low}$ of two target temperatures $T_{low}$, $T_{high}$. The value $T_{target}$ is a binary value. One of the two possible values for $T_{target}$, e.g., zero, represents the lower target temperature $T_{low}$ of the structure 38, and the other of the two possible values for $T_{target}$, e.g., one, represents the higher target temperature $T_{high}$ of the structure 38. The lower target temperature $T_{low}$ may be chosen to be below and near the onset temperature $T_o$ so that, as described below, the temperature T of the structure 38 may be quickly raised above the onset temperature $T_o$. The higher target temperature $T_{high}$ may be chosen to be above and near the onset temperature $T_o$ so that, as described below, the temperature T of the structure 38 may be quickly lowered below the onset temperature $T_o$.

Next, in a block 120, the computer 42 instructs the voltage source 56 to supply electrical current through the structure 38 to raise the temperature T to the lower target temperature $T_{low}$. The computer 42 may instruct the voltage source 56 to continuously supply electrical current until, based on data received from the temperature sensor 60, the temperature T of the structure 38 is substantially equal to the lower target temperature $T_{low}$, and then the computer 42 may maintain the temperature T at the lower target temperature $T_{low}$, e.g., by modulating the voltage source 56 to supply electrical current as the temperature T lowers to keep the temperature T substantially equal to the lower target temperature $T_{low}$.

As described in more detail below in blocks 125-200, if the stored value of $T_{target}$ represents $T_{low}$, the computer 42 instructs the voltage source 56 to maintain the temperature T of the structure 38 at the lower target temperature $T_{low}$ until the speed v of the vehicle 32 is above the threshold for a preset time, after which the computer 42 sets the stored value of $T_{target}$ to represent $T_{high}$ and instructs the voltage source 56 to heat the structure 38 up to the higher target temperature $T_{high}$. If the stored value of $T_{target}$ represents $T_{high}$, the computer 42 instructs the voltage source 56 to maintain the temperature T of the structure 38 at $T_{high}$ until the speed v of the vehicle 32 is below the threshold for the preset time, after which the computer 42 sets the stored value of $T_{target}$ to represent $T_{low}$ and instructs the fans 58 to cool the structure 38 to $T_{low}$.

Next, in a block 125, the computer 42 receives the speed v of the vehicle 32, e.g., from the speed sensor 64, a GPS sensor, etc.

Next, in a decision block 130, the computer 42 determines whether the stored value $T_{target}$ is set to the value representing the lower target temperature $T_{low}$, e.g., zero, or to the value representing the higher target temperature $T_{high}$, e.g., one. If the stored value $T_{target}$ is set to the value representing the higher target temperature $T_{high}$, the process 100 proceeds to a decision block 170.

If the stored value $T_{target}$ is set to the value representing the lower target temperature $T_{low}$, next, in a decision block 135, the computer 42 determines whether the speed v of the vehicle 32 is above the threshold. If the speed v is above the threshold, the process 100 proceeds to the block 145.

If the speed is below the threshold, next, in a block 140, the computer 42 maintains the temperature T at the lower target temperature $T_{low}$, e.g., by modulating the voltage source 56 to supply electrical current as the temperature T lowers to keep the temperature T substantially equal to the lower target temperature $T_{low}$. After the block 140, the process 100 returns to the block 125 to continue monitoring the speed v of the vehicle 32.

After the decision block 135, if the speed v is above the threshold, in a block 145, the computer 42 increments a timer starting at an initial value, e.g., a current time. Next, in a decision block 150, the computer 42 determines whether the timer has expired, i.e., reached a final value that is a preset time after the initial value. The preset time may be chosen so that the value of $T_{target}$ switches when the speed v of the vehicle 32 is likely to continue to be well above or below the threshold for an extended duration, as well as to prevent $T_{target}$ from switching too frequently and causing excessive wear on the components of the bumper assembly 30, e.g., 10 seconds. If the timer has not expired, the process 100 returns to the decision block 135 to check the speed v against the threshold. In other words, in the blocks 135, 145, and 150 collectively, the computer 42 determines whether the speed v of the vehicle 32 remains above the threshold for the entirety of the preset time.

If the timer has expired, next, in a block 155, the computer 42 sets the stored value $T_{target}$ to the value, e.g., one, representing the higher target temperature $T_{high}$.

Next, in a block 165, the computer 42 instructs the voltage source 56 to supply electrical current through the structure 38 to raise the temperature T to the higher target temperature $T_{high}$. The computer 42 may instruct the voltage source 56 to continuously supply electrical current until, based on data received from the temperature sensor 60, the temperature T of the structure 38 is substantially equal to the higher target temperature $T_{high}$.

Next, in a block 165, the computer 42 maintains the temperature T at the higher target temperature $T_{high}$, e.g., by modulating the voltage source 56 to supply electrical current as the temperature T lowers to keep the temperature T substantially equal to the higher target temperature $T_{high}$. After the block 165, the process 100 returns to the block 125 to continue monitoring the speed v of the vehicle 32.

After the decision block 130, if the stored value $T_{target}$ is set to the value representing the higher target temperature $T_{high}$, in the decision block 170, the computer 42 determines whether the speed v of the vehicle 32 is above the threshold. If the speed v is above the threshold, the process 100 proceeds to the block 165 to maintain the structure 38 at the higher target temperature $T_{high}$.

After the decision block 170, if the speed v is below the threshold, in a block 175, the computer 42 increments a timer starting at an initial value, e.g., a current time. Next, in a decision block 180, the computer 42 determines whether the timer has expired, i.e., reached a final value that is the preset time after the initial value. If the timer has not expired, the process 100 returns to the decision block 170 to check the speed v against the threshold. In other words, in the blocks 170-180 collectively, the computer 42 determines whether the speed v of the vehicle 32 remains below the threshold for the entirety of the preset time.

If the timer has expired, next, in a block 185, the computer 42 sets the stored value $T_{target}$ to the value, e.g., zero, representing the lower target temperature $T_{low}$.

Next, in a block 190, the computer 42 turns off the voltage source 56, i.e., prevents the voltage source 56 from supplying current to the structure 38.

Next, in a block 195, the computer 42 activates the fans 58, i.e., instructs the fans 58 to move air through the gaps 40.

Next, in a decision block 200, the computer 42 determines whether the temperature T of the structure 38 is at least as low as the lower target temperature $T_{low}$. The computer 42 uses data from the temperature sensor 60. If the temperature T is not yet as low as the lower target temperature $T_{low}$, the process 100 returns to the block 195 to continue operating the fans 58.

If the temperature T is at least as low as the lower target temperature $T_{low}$, next, in a block 205, the computer 42 deactivates, i.e., stops, the fans 58, so the fans 58 are no longer moving air through the gaps 40. After the block 205, the process 100 returns to the block 125 to continue monitoring the speed v of the vehicle 32.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structure 38d Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A vehicle component comprising:
a bumper beam and a fascia spaced from the bumper beam;
a structure defining gaps between the structure and the bumper beam and between the structure and the fascia; and
a computer programmed to supply electrical current to vary a stiffness of the structure in response to a vehicle speed beyond a threshold.

2. The vehicle component of claim 1, wherein the structure includes a shape-memory polymer.

3. The vehicle component of claim 1, wherein the structure is a composite material including a matrix material and a reinforcement material, the matrix material is a polymer, and the reinforcement material is electrically conductive.

4. The vehicle component of claim 3, wherein the reinforcement material is one of carbon fiber and carbon nanotubes.

5. The vehicle component of claim 1, further comprising a voltage source electrically coupled to the structure.

6. The vehicle component of claim 5, wherein the computer is coupled to the voltage source and programmed to instruct the voltage source to supply electrical current through the structure in response to a vehicle speed being one of above and below the threshold.

7. The vehicle component of claim 6, wherein the computer is programmed to instruct the voltage source to supply electrical current through the structure in response to a vehicle speed being one of above and below the threshold for at least a specified amount of time.

8. The vehicle component of claim 1, further comprising a fan positioned to move air through at least one of the gaps.

9. The vehicle component of claim 8, wherein the computer is coupled to the fan and programmed to actuate the fan in response to a vehicle speed being one of above and below the threshold.

10. The vehicle component of claim 9, wherein the computer is programmed to actuate the fan in response to a vehicle speed being one of above and below the threshold for at least a specified amount of time.

11. The vehicle component of claim 9, further comprising a temperature sensor thermally connected to the structure and coupled to the computer, wherein the computer is further programmed to actuate the fan to maintain the structure at a target temperature so long as the vehicle speed is one of above and below the threshold.

12. The vehicle component of claim 1, wherein the computer is further programmed to supply electrical input to the structure in response to a vehicle speed beyond the threshold for at least a specified amount of time.

13. The vehicle component of claim 1, wherein the stiffness of the structure decreases in response to increasing temperature, the structure has an electrical resistance such that the structure generates heat in response to electrical input, and the computer is programmed to supply electrical current to the structure in response to a vehicle speed above the threshold.

14. The vehicle component of claim 1, further comprising a temperature sensor thermally connected to the structure and coupled to the computer, wherein the computer is further programmed to supply electrical current to maintain the structure at a target temperature so long as the vehicle speed is above the threshold.

15. The vehicle component of claim 1, wherein the bumper beam and the fascia define a volume directly between the bumper beam and the fascia in a vehicle-forward direction, and the structure occupies less than half of the volume.

16. A vehicle component comprising:
a fascia spaced from a bumper beam;
a structure defining gaps between the structure and the bumper beam and between the structure and the fascia; and
means for varying a stiffness of the structure based on a vehicle speed.

17. The vehicle component of claim 16, wherein the means for varying the stiffness of the structure includes means for heating the structure.

18. The vehicle component of claim 17, wherein the means for heating the structure is means for resistive heating of the structure.

19. The vehicle component of claim 17, wherein the means for varying the stiffness of the structure further includes means for cooling the structure.

20. The vehicle component of claim 16, wherein the means for varying the stiffness of the structure includes means for cooling the structure.

* * * * *